FIG. 1

INVENTOR/S
ALBERT R. MORGAN, JR.
PAUL R. ANTOUN,
HOWARD E. CALLAHAN,
THEODORE R. MAUGEL

BY *Melville, Strasser, Foster and Hoffman*
ATTORNEYS

INVENTOR/S
ALBERT R. MORGAN, JR.
PAUL R. ANTOUN,
HOWARD E. CALLAHAN,
THEODORE R. MAUGEL

BY *Melville, Strasser, Foster and Hoffman*
ATTORNEYS

Oct. 19, 1971 A. R. MORGAN, JR., ET AL 3,613,328
LAMINATED STRIP SHINGLE WITH MULTIPLE EXTENDED
SHADOW-PRODUCING TABS OF VARIABLE
WIDTH AND LENGTH
Filed May 13, 1970 8 Sheets-Sheet 8

FIG. 11

INVENTOR/S
ALBERT R. MORGAN, JR.
PAUL R. ANTOUN
HOWARD E. CALLAHAN
THEODORE. R. MAUGEL

BY *Melville, Strasser, Foster and Hoffman*
ATTORNEYS

United States Patent Office 3,613,328
Patented Oct. 19, 1971

3,613,328
LAMINATED STRIP SHINGLE WITH MULTIPLE EXTENDED SHADOW-PRODUCING TABS OF VARIABLE WIDTH AND LENGTH
Albert R. Morgan, Jr., Paul R. Antoun, Howard E. Callahan, and Theodore R. Maugel, Cincinnati, Ohio, assignors to Panacon Corporation, Cincinnati, Ohio
Filed May 13, 1970, Ser. No. 36,891
Int. Cl. E04d 1/00
U.S. Cl. 52—555
19 Claims

ABSTRACT OF THE DISCLOSURE

A laminated, mineral-surfaced, asphalt strip shingle, which, when laid in courses on a roof, simulates the irregularity and attendant shadow effects found in wood shingles, while complying with Underwriters' Laboratories, Inc., standards for fire retardant asphalt shingles. The laminated shingle comprises an overlay lamina of asphalt roofing composition, of full width and length dimensions, with widely spaced cut-out tabs in its exposed area as applied on a roof, said cut-out tabs being of generally rectangular shape, and each being of different width and length. An underlay lamina, constituted by a narrow sheet of the same asphalt composition roofing material with no cut-outs, is laminated adhesively to the underside of the overlay lamina, filling the spaces between the tabs of the overlay lamina and providing tab-simulating areas between said tabs. The tabs of the overlay lamina overhang the lower edge of the underlay lamina, and the underlay lamina is shifted laterally with respect to the overlay lamina by a small amount to cover the butt joint between adjacent underlay laminae in the same course. Vertical alignment marks are provided, such that the underlay lamina overhangs the tops of the cut-outs between tabs of the overlay lamina in the next lower course. A plurality of horizontal laying marks, differently spaced, are provided to create a laying program, which avoids the appearance of repetitive or directional patterning.

CROSS REFERENCE TO RELATED APPLICATION

This application is directed to the same purpose as, and achieves a similar result, to copending application Ser. No. 973, filed Jan. 6, 1970, by the same inventors. The purposes of the invention are achieved, according to the teachings herein, in a different way.

BRIEF SUMMARY OF THE INVENTION

This invention relates to a multi-tab strip shingle and particularly to an asphaltic composition shingle that when applied as a roof covering provides a very close and pleasing simulation of the appearance of a roof covered with wood shingles. To achieve the "natural" irregularity and variations of length, width, and thickness, with the attendant variable shadow effects that characterized wood shingles, the strip shingle of this invention is provided with *extended shadow-producing tabs* of variable width and length and which exhibit differences in surface elevation corresponding to different thicknesses as seen by the viewer. The unique combination of the special configurations, dimensions, and arrangement of the shingle parts, especially of the tabs, results in structural and visual relationships when the shingles are laid in courses in the usual manner that produce an irregular appearance of the course line and natural shadows are cast along the vertical edges of the tabs and the butts of the shingles.

In our copending application, Ser. No. 973, filed Jan. 6, 1970, there were cited the following U.S. patents, representing the typical prior art efforts to produce asphalt composition roof coverings simulating wood shingles.

Croce, Pat. No. 2,142,181
MacNutt, Pat. No. 2,170,534
Schuetz et al., Pat. No. 2,171,010
Wittenberg, Pat. No. 2,178,273
Leibrook, Pat. No. 3,407,556

To avoid repetition, the descriptions of the products of these patents and the reasons for their failure to achieve the desired results are to be included by cross-reference in the specification of this application.

In our copending application above identified we also presented an extensive analysis of the appearance characteristics of wood shingles in place on a roof and the basic reasons for their unique appearance. These reasons included: individual variations in width, length and thickness; variations in color and surface texture; individual application by the workman; effects of moisture and of weathering; warping of shingle butt edges; staining and airborne soot and dirt deposits, etc. The disadvantages of wood shingles, particularly their high fire hazard, and the several advantages of asphalt shingles—long weathering life, permanence of original appearance, availability of a wide range of colors, and high fire resistance—were stated in detail. By cross reference, all of that discussion is to be included in this application.

The primary purpose of this invention is to provide an asphaltic composition strip shingle that may be applied by the workman in the usual manner in horizontal, vertical or diagonal courses on the roof and which, when so applied, results in an over-all appearance having the slight irregularity and "natural" variations in dimensions that are characteristic of a wood shingle roof.

It is a particular object of the invention to provide the strip shingle with extended, shadow-producing tabs which are capable of simulating very closely the variable natural shadow effects which occur on wood shingle roofs, by airranging the tabs and other shingle parts in a structural relationship that actually casts similar shadows.

It is a special purpose of one feature of the invention to modify the underlay lamina of the strip shingle in such a way that it achieves the dual result of providing support for the extended tabs and of accentuating the irregularity of the course line when the shingles are in place on the roof.

A further object is to provide the strip shingle of this invention with both vertical and horizontal alignment marks or notches which serve as guides and make it easier for the workmen to apply the shingles with correct placement in the courses on the roof. Proper placement ensures that natural shadows will be produced along the lower edge of each course and also avoids the appearance of objectionable repetitive patterning of the tabs when viewing any area of the roof.

It is also an auxiliary object of this invention to adapt the laminated structure of the strip shingle so that the overlay lamina provides a cover for the abutting end of the underlay lamina of the adjacent shingle in the course, thus making a roof covered with these shingles highly leak-resistant.

Generally, the object of this invention is not only to provide an asphalt shingle roof covering that closely simulates the appearance of a wood shingle roof, but which also has the inherent advantages of greater fire resistance, long weathering life, and excellent retention of its original appearance after long periods of weather exposure, being free of the deterioration resulting from weathering that is characteristic of wood shingles.

DETAILED DESCRIPTION OF THE INVENTION

To achieve the several purposes of this invention, it has been found desirable to construct the strip shingle in laminated form, using mineral surfaced asphalt roofing sheet material of the same kind generally used for the production of conventional asphalt strip shingles. The overlay lamina and the underlay (base) lamina differ radically in shape and dimensions and neither one alone would be suitable for use as a shingle roof covering, but when laminated together a composite strip shingle is produced that has unique advantages and appearance features.

THE OVERLAY LAMINA OF THE COMPOSITE SHINGLE

The overlay lamina consists of a strip shingle of the full width and length dimensions of the laminated shingle to be produced, but has in its lower portion (which becomes the exposed area of the shingle when applied on the roof) multiple, widely-spaced cut-out tabs of generally rectangular shape and each of different width and length.

Figure 1:
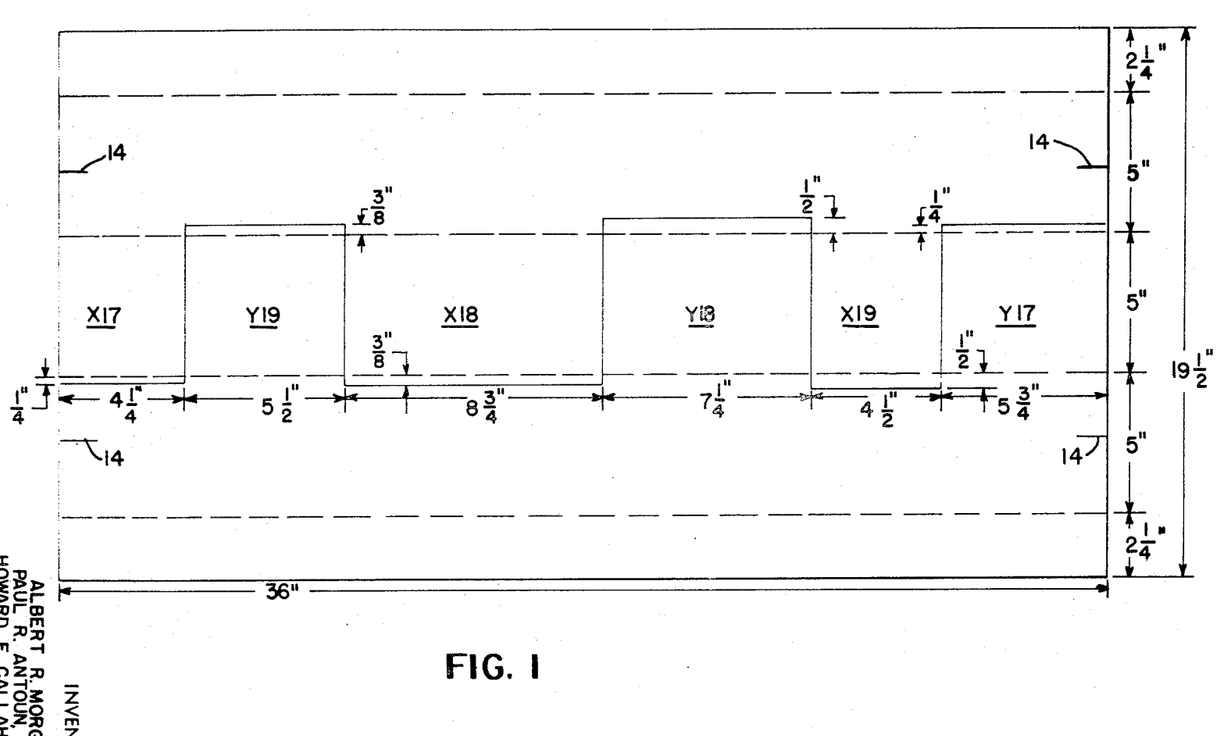
FIG. 1 is a plan view showing the cutting pattern for the overlay shingle laminae—two complementary, interfitting-tab, mineral-surfaced asphalt shingle strips, which may be designated X (male) and Y (female) for purposes of reference in the description.

The overlay lamina is most conveniently produced by cutting two complementary, interfitting-tab overlays on the roofining machine from a sheet of shingle roofing material, as shown in the typical cutting pattern of FIG. 1. This results in two different overlays, designated X (male) and Y (female), each of which has individually different tab widths and lengths, with the cut-out spaces between the tabs also differing both in width and length. It is evident that each of these overlays, when combined with the underlay lamina to produce the composite laminated shingle, will make a strip shingle having different tabs and dimensional relationships and, therefore, different appearance, although both shingles are of the same overall width and length. Thus, on the roofing machine equal quantities of two different shingles are produced, in complementary pairs, termed "rights" and "lefts." While a roof could be covered with all X overlay shingles or with all Y overlay shingles and result in a satisfactory simulation of a wood shingle roof, it is advantageous to apply a mixture of the two different shingles because their differences in tab dimensions and overshangs enhance the desired appearance of non-regularity of the roof covering.

THE UNDERLAY LAMINA

The underlay lamina U (FIG. 2), is a narrow unitary sheet of the same asphalt composition roofing material as the overlay and of the same length, without any cut-outs. Due to its narrow width it would be unsuitable for application as a shingle roof covering.

Figure 4:
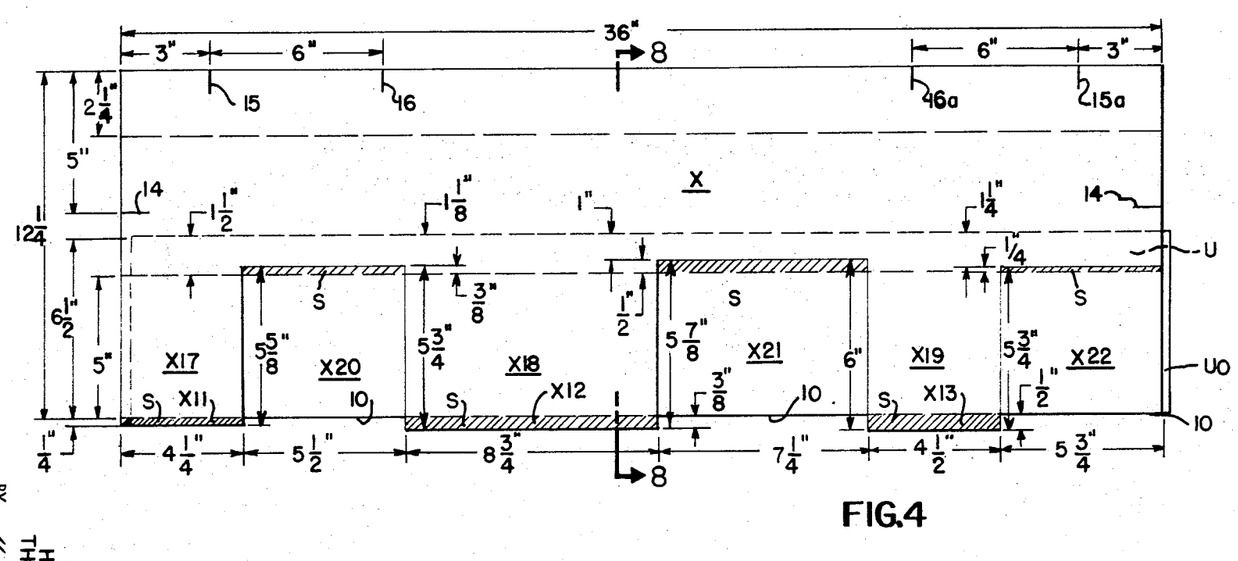
FIG. 4 is a plan view of the assembled laminated strip shingle, with overlay lamina X adhesively secured to the base (underlay) lamina. The positions of vertical and horizontal alignment marks for laying the shingles are shown.
Figure 5:
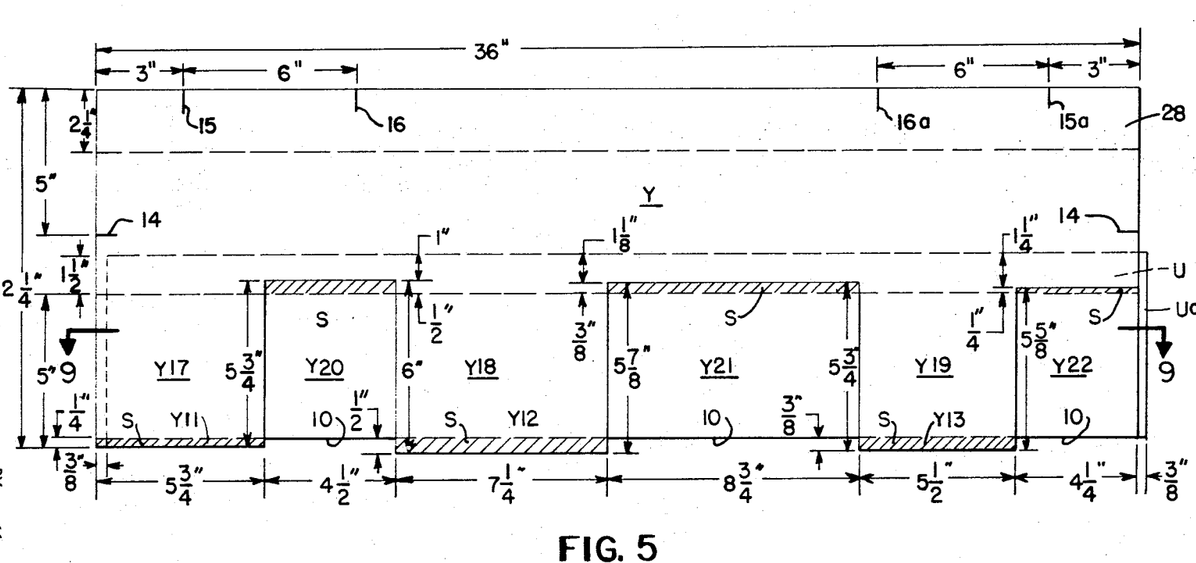
FIG. 5 is a view similar to FIG. 4, but with overlay lamina Y adhesively secured to the underlay lamina.

The chief purpose of the underlay lamina is to fill the spaces between the widely-spaced cut-out tabs of the overlay so as to provide tab-simulating areas between the tabs in the composite laminated shingle. The underlay lamina therefore needs to be only of the width of the tab exposure plus sufficient lap above the cut-outs to ensure secure sealing together of the two laminae. Thus, the underlay lamina generally needs to be only slightly more than half the width of the composite laminated shingle to provide a lap of at least 1 inch above the tops of the cut-outs. In the typical laminated strip shingle of this invention, as illustrated in FIG. 4 and FIG. 5, the width of the underlay lamina is 6½ inches which is fifty-three percent of the width (12¼") of the composite laminated shingle (excluding the tab overhangs). If the underlay lamina were made appreciably wider this would serve no useful purpose and would substantially increase the weight and cost of the laminated shingle. Preferably, the width of the underlay lamina does not exceed sixty percent of the total width of the composite laminated strip shingle.

THE OVERLAY AND UNDERLAY LAMINAE AS COMBINED TO PRODUCE THE LAMINATED SHINGLE

The mechanical apparatus and methods used for adhesively combining two sheets or cut pieces of mineral surfaced asphalt roofing material are well known in the industry and need not be described in detail. The adhesive material used for cementing together the overlay shingle lamina and the underlay lamina is preferably a suitable roofing asphalt, but other adhesives that are adequately weather resistant and that provide a strong, permanent bond between two sheets of asphalt roofing material may be used.

When the overlay and underlay laminae are adhesively combined, the underlay is positioned underneath the tabs of the overlay so that each tab and a horizontal strip of the overlay immediately above the tops of the tabs are adhesively secured to form the laminated shingle, as shown in FIG. 4 and FIG. 5. The portion of the laminated shingle above the top portion of the underlay is of single thickness, as are also the areas between the tabs in the lower, exposed portion of the strip. These areas, differing in length and width from the adjacent tabs, become tab-simulating areas or "simulated tabs" of the composite laminated strip shingle when it is in place on the roof. The lower edge 10 of the underlay lamina becomes the lower edge of the laminated strip shingle and, therefore, determines the course line when the shingles are laid in a horizontal course on the roof. As the individual tabs are each of different length, the underlay lamina is so positioned beneath the overlay lamina that the tabs extend substantially beyond the lower edge of the underlay lamina to form projecting ledges, as at X11, X12, X13, and Y11, Y12 and Y13, each of which overhangs by a different distance. These overhangs are correctly designated "extended shadow-producing tabs" of the laminated strip shingle. The amount of overhang may vary from zero to ¾ inch and preferably is from ¼ inch to ¾ inch. It should be noted that the *sequence* of tab overhangs is *reversed* in the two complementary strip shingles produced with the two different overlays X and Y.

Figure 9:
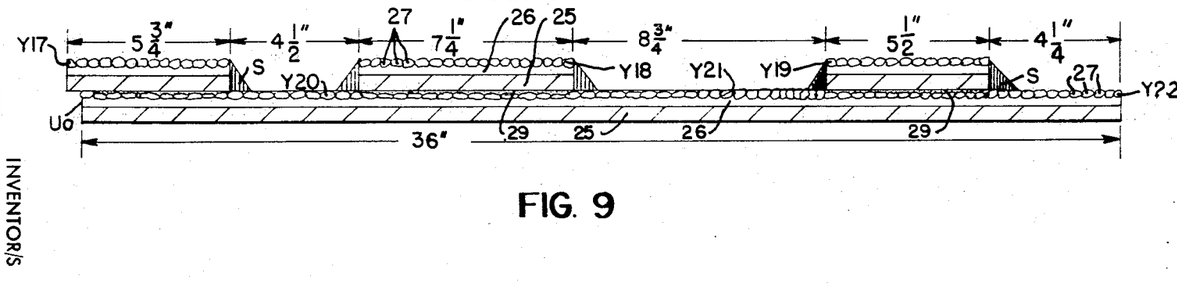
FIG. 9 is an enlarged cross sectional view, taken on the line 9a—9a of FIG. 5, of the laminated shingle with overlay Y cut along a line parallel to the upper (horizontal) edge of the strip, through the exposed area of the shingle as applied on a roof, showing differences in elevation of the surface planes of both the overlay (tab) lamina and of the underlay lamina (tab-simulating areas) between the tabs, and indicating the locations where shadows will be cast along the vertical edges.

It is evident that the novel laminated strip shingle above described provides unique structural relationships of the shingle parts, especially the tabs, that enable a roof covering of these shingles to achieve the characteristic irregularity and shadow effects of a wood shingle roof. The extended tabs Y17, Y18 and Y19, and the tab-simulating areas Y20, Y21 and Y22 between the tabs are at different surface elevations, as shown in FIG. 9, and give the visual impression to the viewer of adjacent shingles having different thicknesses. The overlay tabs of different width and length, in combination with the tab-simulating areas of the underlay lamina exposed between the tabs, each of different width and each different in width from the tabs, give the irregular appearance of a course of shingles of varying width and length. Since the tabs extend below the edge of the underlay lamina 10, this makes the course edge appear somewhat irregular, as it actually is. If desired, this irregularity may be further enhanced by angular or irregular cutting of the bottom edges of the tabs.

Particularly, the extended lower portions of the tabs (X11, X12, X13, and Y11, Y12, Y13) form overhung ledges that cast natural shadows beneath and along the upper edge of the underlying course of shingles as laid on a roof. Summarizing, this new laminated shingle presents an over-all appearance of natural irreguarity of width, length and thickness of the shingles, irregularity of the horizontal course line, and it casts natural shadows along the vertical edges of the tabs and along the upper edge of the underlying course on the roof.

TAB CONFIGURATIONS AND SHINGLE DIMENSIONS

The tabs are described as generally rectangular and are shown as rectangular in the drawings. They need not be precisely rectangular and, if desired, the vertical edges of the tabs may be cut with a deviation of about 2° to 8° from a true vertical line to make the bottom edge of the tab slightly wider than its top edge. Such deviation from true rectangular actually enhances the visual effect of irregularity in the general view of the roof, although a deviation exceeding 10° tends to produce an undesirable angular appearance of the tabs. A deviation of less than 2° from the vertical can hardly be detected by the human eye and would not contribute appreciably to the visual effect of irregularity.

Wood shingles are available in a wide range of dimensions and the laminated strip shingle of this invention also can be produced in various dimensions. However, for practical purposes of handling on the roofing machine, packaging, shipment and application, it is desirable that the shingle dimensions should conform generally to the dimensions of the asphalt strip shingles which constitute the industry's major volume product, namely, 12" x 36" strips. This standard type of strip shingle usually has three rectangular tabs, each 5" x 12", and is intended for application with 5-inch exposure and 2 inch headlap.

The new laminated strip shingle employing the features herein disclosed can be produced in other dimensions as to width and length, or for exposure greater than 5 inches, within the limits of practical handling in manufacture and application, and such shingles will have similar appearance advantages in respect to irregularity and shadows and will closely simulate wood shingle roof coverings when applied. For example, the strip can be produced in 48" length or even up to 72" length. With longer strip shingles, the number of tabs per strip will be increased, making possible a greater variation in individual tab configurations and at the same time reducing the number of shingles required per square of roof area. Thus a 12" x 48" strip shingle may have four or five tabs, each of different width and length, and an equal number of tab-simulating areas, and when laid with five inch exposure will require the handling of only sixty pieces per square instead of eighty pieces as needed for 12" x 36" strips. The greater the number of different dimensioned tabs the closer will be the simulation of "natural" variation of shingle dimensions, as seen in wood shingles.

MODIFICATION OF THE LAMINATED SHINGLE TO PROVIDE ADDITIONAL SHADOW EFFECTS ALONG THE COURSE LINE

The shadow effects along the course edge of the shingles may be substantially reinforced by providing them with suitably positioned vertical alignment marks 14 which control the vertical overlap of the course as laid on the roof. When laid to these guide marks, one at each end edge of the strip, the correct course exposure (such as 5 inches) is ensured and further, the lower edge Ue of the underlay lamina of the overlying shingle 15 overhangs the top lines of the cut-out spaces X20, X21 and X22 (or Y20, Y21 and Y22) of the overlay lamina (the tab-simulating areas of the laminated shingle) of the underlying shingle, as clearly shown in FIG. 11. Depending on the tab and cut-out dimensions of the overlay the extent of this overhang may vary from ¼ inch to as much as ½ inch. These overhung edges of the underlay lamina form additional horizontal ledges between the tabs, beneath and along which a natural shadow will be cast by the sun. In the preferred embodiments of the invention this additional shadow-producing feature is included.

LAMINATED CONSTRUCTION ENABLES PROVIDING A LEAK-RESISTANT RABBETED COVER FOR THE VERTICAL END JOINTS

Figure 6:
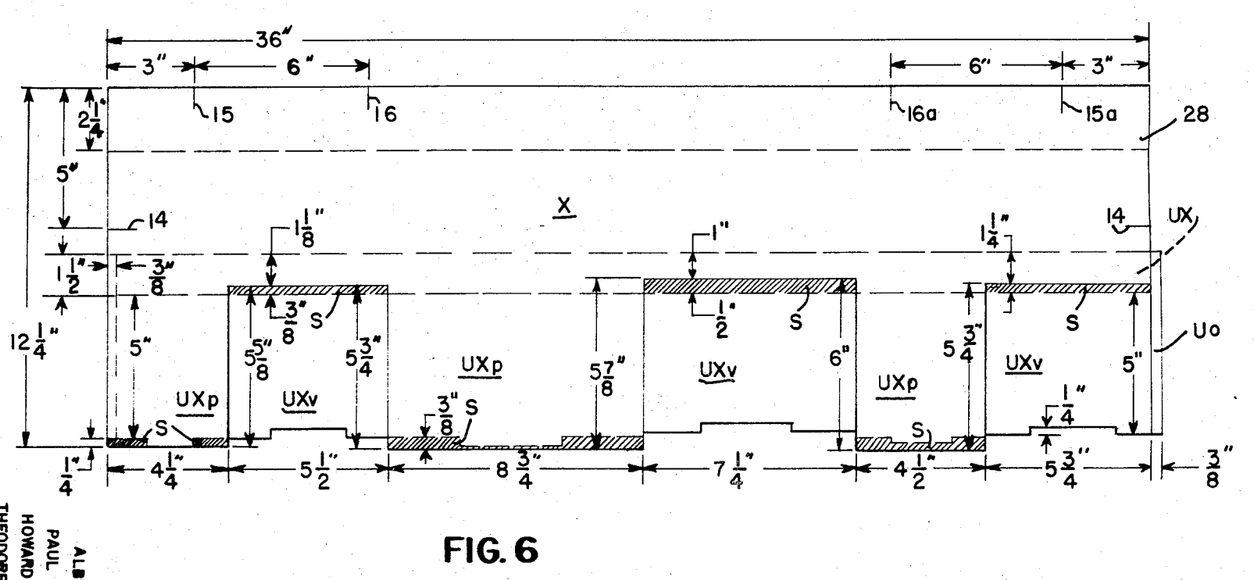
FIG. 6 is a view similar to FIG. 4, but with overlay lamina X adhesively secured to the *modified* underlay lamina UX of FIG. 3.

A desirable feature of this new shingle, which is made possible by its laminated construction, is the use of the overlay lamina to provide a rabbeted cover for the end joints of abutting shingles as laid in a course so as to minimize the possible leakage of water through these joints. This is done by shifting the underlay lamina U laterally beneath the tabs of the overlay to provide an offset Uo of at least about ¼ inch, and up to about ½ inch, as shown in FIG. 4, FIG. 5 and FIG. 6. Thus, when the shingles are applied in a horizontal course, the projection of the overlay lamina at the left end completely covers the vertical joint between the abutting shingles up to the top line of the underlay lamina. This is the preferred construction and provides a roof covering that is highly leak resistant.

MODIFICATION OF THE BASE LAMINA AS A FURTHER IMPROVEMENT

As a special feature of one preferred embodiment of this invention, it has been discovered that the base lamina may be modified in a manner such that it provides support for the extended overhang tabs of the overlay lamina and at the same time increases to a pleasing degree the appearance of slight irregularity of the shingle course line on the roof.

Figure 2:
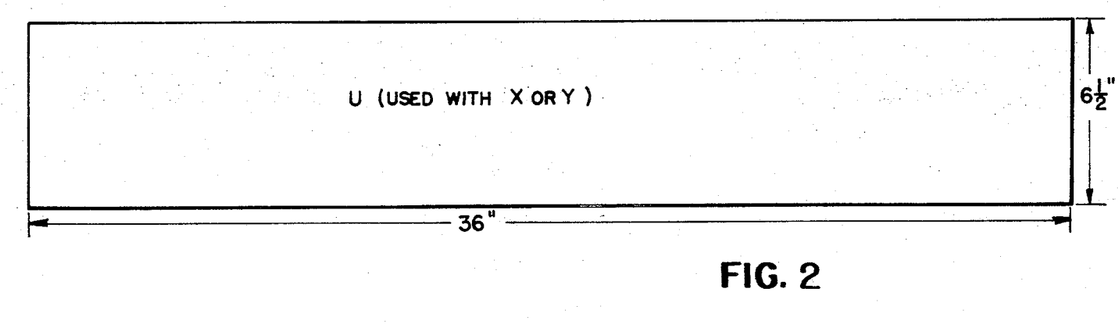
FIG. 2 is a plan view of the underlay lamina—a unitary, narrow strip of mineral-surfaced asphalt shingle roofing.

FIG. 2 shows the simplest form of underlay lamina, a rectangular strip of shingle roofing material, 6½" x 36". When this underlay lamina is adhesively combined with overlay lamina X, the resulting laminated shingle has the appearance shown in FIG. 4. It will be noted that the lower edges 10 of the tab-simultating areas between the extended tabs are straight lines.

Figure 3:
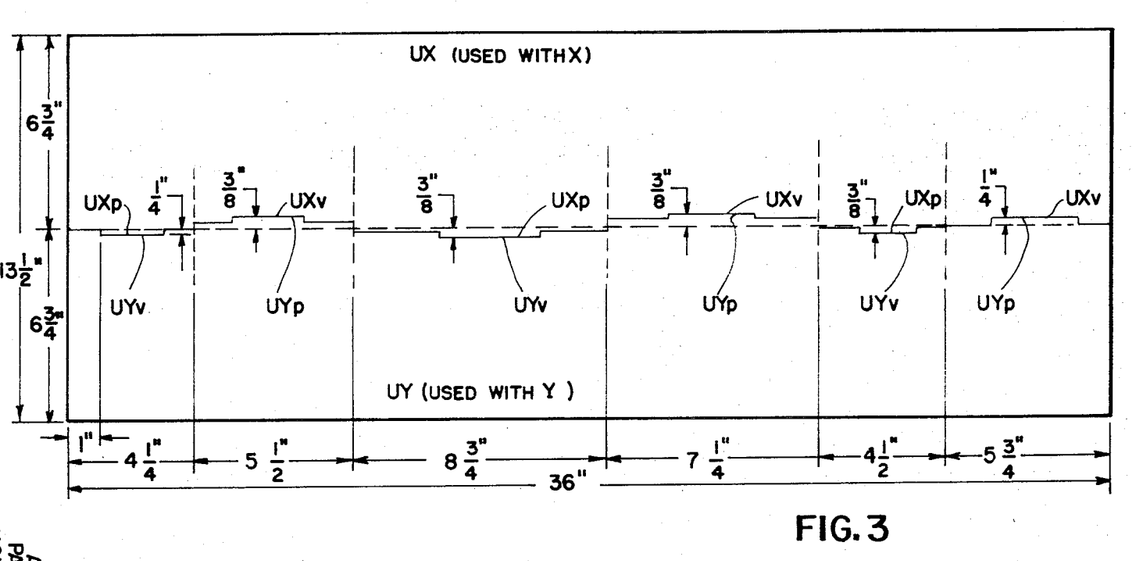
FIG. 3 is a plan view of the cutting pattern for a *modified* underlay lamina, having an irregular, angular stepped cut of the lower edge (which becomes the butt line of the assembled laminated shingle). Two complementary, interfitting underlay laminae are produced, which may be designated UX (male) and UY (female) underlays for purposes of reference.

As shown in FIG. 3, which is the cutting pattern for the *modified* underlay lamina, the lower edge of this lamina may be cut to provide an irregular stepped or serrated line rather than being straight. The peaks of these angular cuts are made to lie generally at or near the vertical center line of the extended tabs and the valleys between these peaks lie in the tab-simulating areas between the tabs. Thus, the peak of shingle material underneath each extended tab supports it and prevents or limits any tendency for the extended tab to sag under the heat of the sun, but does not prevent the extended tab from casting a natural shadow. The valleys made by the angular cuts between the peaks present a visual irregularity in the tab-simulating areas, which is additive to but different from the irregularity of the course line produced by the extended tabs.

The improvement in appearance can easily be seen by comparing the laminated strip shingle of FIG. 6 with the strip shingle of FIG. 4, both produced with overlay X. The laminated shingle of FIG. 6 was produced with the *modified* underlay lamina UX of FIG. 3.

Figure 7:
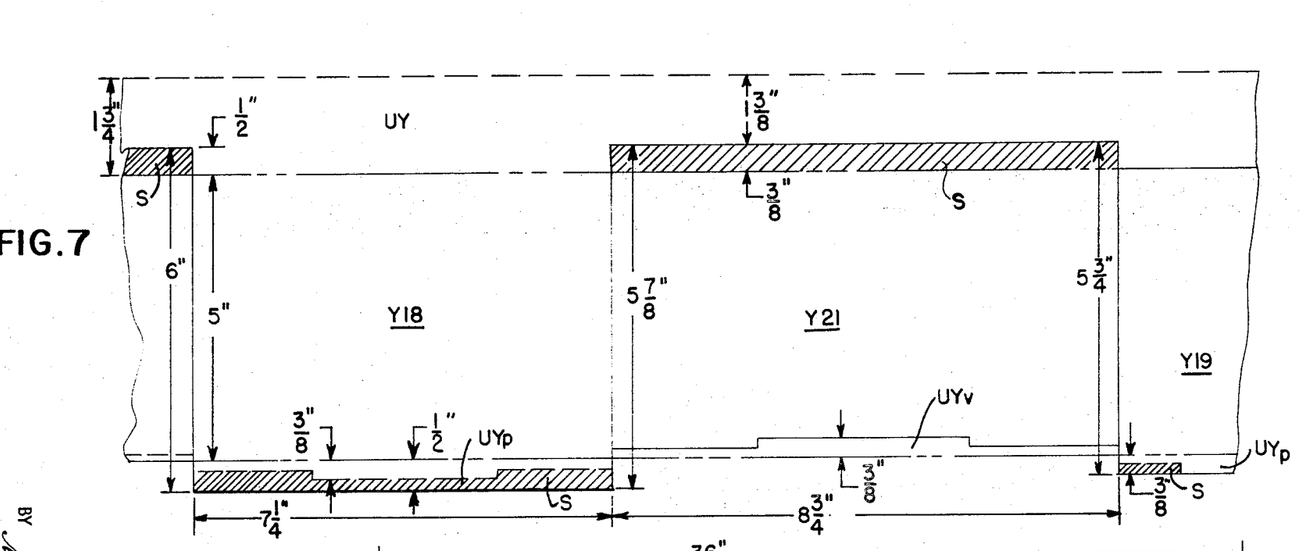
FIG. 7 is an enlarged fragmentary plan view of a single extended tab and the adjacent tab-simulating area of the assembled laminated strip shingle of FIG. 5, with overlay lamina Y adhesively secured to the *modified* underlay lamina UY of FIG. 3.

FIG. 7 shows in enlarged detail the manner in which the *modified* base lamina produces the results above described in the composite laminated strip shingle. It is obvious that the cuts of the lower edge of the base lamina need not be angular as shown, but could be sinuous or otherwise irregular and achieve the same purpose, provided the peaks UX$p$ (or UY$p$) are aligned with the tabs and the valleys UX$v$ (or UY$v$) with the tab-simulating areas. The maximum height of the peaks—i.e. their distance from the true horizontal course line—should not exceed the maximum amount of overhang of the tabs. If the overhang is ¼ inch then the peak of the serrated cut for that tab should not exceed ¼ inch, as in FIG. 6.

Referring to FIG. 3, it is seen that two different, complementary underlays are produced, designated UX and UY. The peaks of the stepped cuts of UX (UX$p$) correspond to the tabs of overlay X and the peaks of UY (UY$p$) with the tabs of overlay Y. Underlay UX is therefore used with overlay X and UY with overlay Y in assembling the laminated shingles.

THE NEW LAMINATED SHINGLE CONFORMING GENERALLY TO PRESENT ROOFING INDUSTRY STANDARDS

When the new laminated shingle is produced as a 36" strip, conforming to present industry standards, the number of tabs of the overlay lamina may range from two to four, but a three-tab overlay is considered preferable. Shingles made with a two-tab overlay will give the general appearance of wide wood shingles which some architects may prefer. A four-tab overlay will give an appearance effect of quite narrow wood shingles which is less desirable. A three-tab overlay can be arranged to include both wide and narrow tabs, so that when applied on a roof the general appearance is that of a mixture of shingles of varying width, so characteristic of wood shingle roofs.

In selecting the dimensions for a three-tab overlay, it is preferable that one tab should be relatively *wide*, and the other two relatively *narrow*, or of *intermediate* width, as shown in FIG. 4 and FIG. 5. The sequence of tab widths lengthwise of the strip is optional and the tab widths can be varied within wide limits, but in any event each tab should differ in width from the others. It is considered preferable to place the widest tab between the other two tabs as this emphasizes the differences in width to the viewer. Likewise, one of the tab-simulating cut-out spaces will be relatively wide and the other two of narrower width, due to the complementary relationship of the tabs and the cut-outs in the cutting pattern.

For a 36" strip shingle having only two tabs, it is preferable that each of the tabs should have a shadow-producing overhang, each of different length, to maintain the visual effect of course irregularity. If, however, the number of tabs is three or four, the overhang of one of the tabs may be omitted so that the lower edge of the tab is flush (coincides) with the lower edge of the underlay lamina 10. The flush tab is preferably placed either at the left end or the right end of the strip so as to make it somewhat easier for the workman to align the shingles properly in a horizontal course on the roof.

Generally, in application of the novel laminated shingles of this invention on a roof it is desirable to lay them in courses as a mixture of alternate X and Y overlays. A programmed laying schedule controlled by horizontal laying marks or notches (15, 16, 15a and 16a) on the top edge of the shingle that provide a predetermined offset distance for successive courses is also desirable. This ensures a consistently pleasing distribution of the differently-dimensioned tabs and avoids excessive grouping of similar tabs in local areas of the general field of the roof. The horizontal laying marks for programmed application are shown along the upper edge of the shingle near each end, in FIG. 4, FIG. 5 and FIG. 6.

ACCENTUATION OF VISUAL DIFFERENTIATION BETWEEN THE TABS AND THE TAB-SIMULATING AREAS OF THE LAMINATED SHINGLE

The laminated construction consisting of an overlay shingle lamina having widely-spaced cut-out tabs, with an underlay lamina beneath the tabs filling the cut-out spaces, results in a substantial difference of surface elevation between the tabs and the cut-out spaces where the underlay lamina is exposed between the tabs. This difference is the thickness of the overlay tabs. When the shingles are in place on the roof these areas between the tabs also appear to be tabs or shingles, but of lesser thickness than the tabs and may correctly be designated tab-simulating areas or "simulated tabs."

In some cases it may be found desirable to reinforce the visual differentiation between the tabs and the adjacent tab-simulating areas by modifying the surface appearance of one or the other, or even both, to emphasize the difference in elevation and apparent thickness. This may be done by embossing or "texturing" one or the other, or both, of these areas; by using mineral surfacing granules of different size grading on each of these areas; by using mineral granules of different colors or color blends as the surfacing on each of these areas; or by embossing the tab area with a different texture pattern as to spacing of lines and depth or width of embossing from that used on the tab-simulating areas. Of course, numerous variations and combinations of the above methods can be employed to achieve the desired degree of differentiation.

SELF-SEALING FEATURE INCLUDED IN THE LAMINATED SHINGLE

Figure 12:
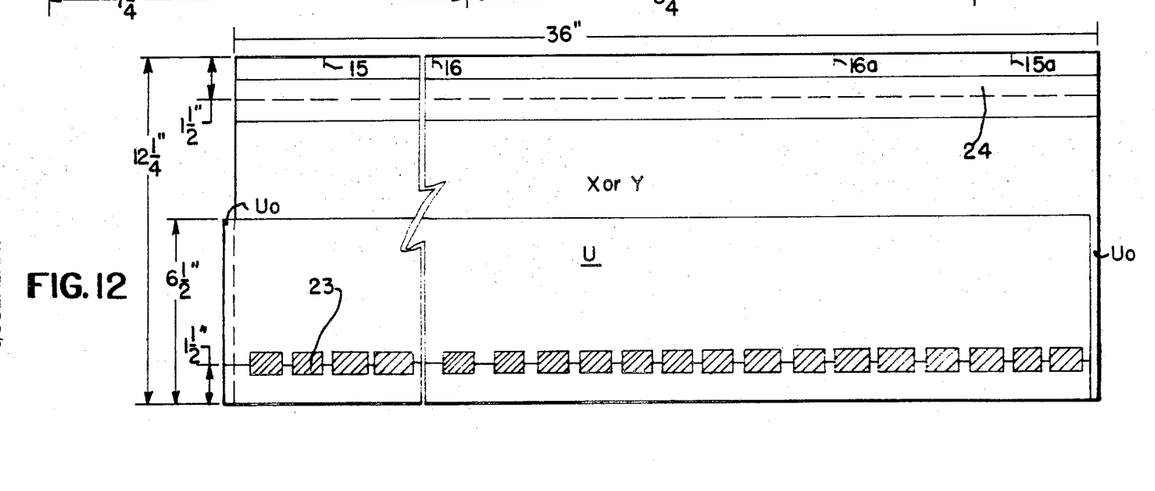
FIG. 12 is a plan view of a laminated shingle according to FIG. 4 or FIG. 5 from the reverse side, showing a strip of self-sealing adhesive which becomes activated by the heat of the sun after the shingles have been applied on the roof, to seal the shingles to those in the underlying course and make them resistant to blowing up in the wind. The strip of release tape which prevents the shingles from sticking together in the package is also shown.

In the preferred embodiments of the invention the shingles are also provided with a "seal down" feature, such as a strip 23 of asphalt adhesive on the reverse side, as shown in FIG. 12. This adhesive strip may be continuous, but preferably is interrupted with small gaps that permit drainage of moisture from underneath the tabs of the shingle. This adhesive is thermosensitive and when activated by the heat of the sun, seals the shingles to those in the underlying course and prevents blowing up in the wind, so that a roof covering of these novel shingles is highly wind-resistant. The purpose of the release tape 24 is to prevent the shingles from sticking together in the package during storage and shipment. The location of the asphalt adhesive strip and of the release tape may, if desired, be altered from that shown in FIG. 12, for convenience in manufacture, packaging and application of the shingles.

TYPICAL EXAMPLE OF THE INVENTION

This invention is not limited to any particular asphaltic roofing composition, but the shingles of the typical example as herein described where produced to meet the requirements of Underwriters' Laboratories, Inc. Standard UL 55B (1962) for class "C" asphalt roofing and shingles, A.S.T.M. Standard D225–62, and the Federal specifications for asphalt shingles, all of which have identical requirements. If desired, the new shingles can be produced to meet still higher fire-retardant ratings, namely, Underwriters' Laboratories class "B" or class "A," by using a special fire-retardant asphalt coating composition, such as disclosed in the Fasold et al. Pat. No. 2,326,273.

Figure 8:
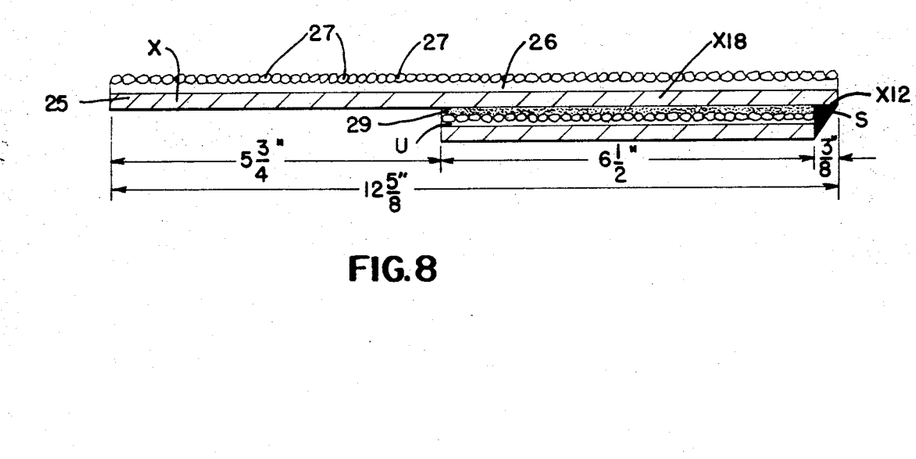
FIG. 8 is an enlarged cross sectional view, taken on the line 8a—8a of FIG. 4, of the laminated shingle with overlay X, parallel to the end edge of the strip and through the middle tab portion of the overlay, showing extension of the overlay tab beyond the lower edge of the underlay lamina.

The laminated shingles of the typical example were produced from mineral granule surfaced asphalt shingle sheet in the usual manner, using nominal 55 lb. dry felt 25, with asphalt saturant, coating 26, and granules 27 as shown in FIGS. 8 and 9, to make a roofing sheet weighing about 100 lb. per 100 square feet, meeting the requirements of Underwriters' Laboratories, Inc. Standard for class "C" fire-retardant roofing. From this sheet both the overlay shingle lamina and the underlay lamina were cut.

FIG. 1 shows the cutting pattern for the overlay shingle laminae. Two complementary overlay shingles were produced, X (male) and Y (female), each 12¾" x 36" in over-all dimensions, from a roofing sheet 19½" wide. The underlay lamina was a unitary roofing strip, 6½" x 36" (FIG. 2), and three of these strips were cut from a roofing sheet 19½" wide, thus both the overlay lamina and the underlay lamina were produced on the same roofing machine, from the same kind of roofing stock and from the same width of roofing sheet.

Overlay lamina X was adhesively combined with a strip of the underlay lamina, using roofing asphalt as the adhesive, to produce the composite laminated shingle shown in FIG. 4. This shingle has vertical alignment notches 14 at each end, 5 inches from the top edge, to provide 5-inch course exposure of the tabs and also has along the top edge, at 3" and 6", respectively, from each end two horizontal offset alignment notches 15, 15a and 16, 16a to provide a three-course laying program.

Describing the laminated shingle produced with overlay X, it is seen that there are three rectangular tabs, of 4¼", 8¾" and 4½" widths; three rectangular tab-simulating areas, of 5½", 7¼", and 5¾" widths; three tab overhangs, of ¼", ⅜" and ½" lengths; and three overhang spaces between the tops of the tabs along the course line of an overlying shingle, of ⅜", ½" and ¼", respectively. Each tab is of different dimensions and each tab-simulating area is of different dimensions. Thus, when these laminated shingles are applied on a roof they present the appearance of having *six tabs* of different width and length, two of which are relatively wide and the remaining tabs of narrow or intermediate width.

FIG. 5 shows the composite laminated strip shingle produced by adhesively combining overlay lamina Y with the underlay lamina strip, as described above for overlay lamina X. This laminated shingle is similar to that produced with overlay X, except that all the tab dimensions and tab-simulating area dimensions are different, i.e., complementary, as shown in FIG. 1. Vertical and horizontal alignment notches are the same as for the shingle with overlay X.

Describing the laminated shingle produced with overlay Y, it is seen that it has three rectangular tabs, of 5¾", 7¼" and 5½" widths; three rectangular tab-simulating areas, of 4½", 8¾" and 4¼" widths; three overhung spaces between the tops of the tabs along the course line of an overlying shingle, of ½", ⅜" and ¼", respectively, and three tab overhangs, of ¼", ½" and ⅜", respectively.

FIG. 4 and FIG. 5 show that both of these laminated shingles are provided with a rabbeted cover Uo for the end joint, by shifting the underlay lamina ⅜ inch laterally beneath the tabs before the underlay is adhesively secured to the overlay lamina.

As to the overhang of the extended shadow-producing tabs below the lower edge of the underlay lamina it will be observed that each tab overhangs by a different distance. Also, for overlay X the sequence of overhang tabs, from left to right, is reversed from that for overlay Y so that the order along the lower edge is different. Thus, when shingles with overlay X and overlay Y are laid alternately in a course the visual impression of random irregularity of the course edge is increased. The sequence of tab overhangs for alternate X–Y laying is: ¼"–⅜"–½"–¼"–½"–⅜", so that the ¼" overhang repeats on the third succeeding tab in the course, the ⅜" overhang repeats on the fourth succeeding tab and the ½" overhang repeats on the second succeeding tab.

Reference to FIG. 8 shows how the ⅜" extended tab X12 casts a natural shadow S along the course line 10 of the laminated shingle produced with overlay X; the extended tabs of a shingle with overlay Y produce a similar shadow effect. FIG. 9 shows how natural shadows S are produced along the vertical edges of the tabs of the laminated shingle made with overlay Y, resulting from the difference in surface elevation of the tabs and the adjacent tab-simulating areas between the tabs. Except for the dimensions and spacing of the tabs, shadows produced by a laminated shingle made with overlay Y would be identical with those cast by a laminated shingle made with overlay X.

Figure 11:
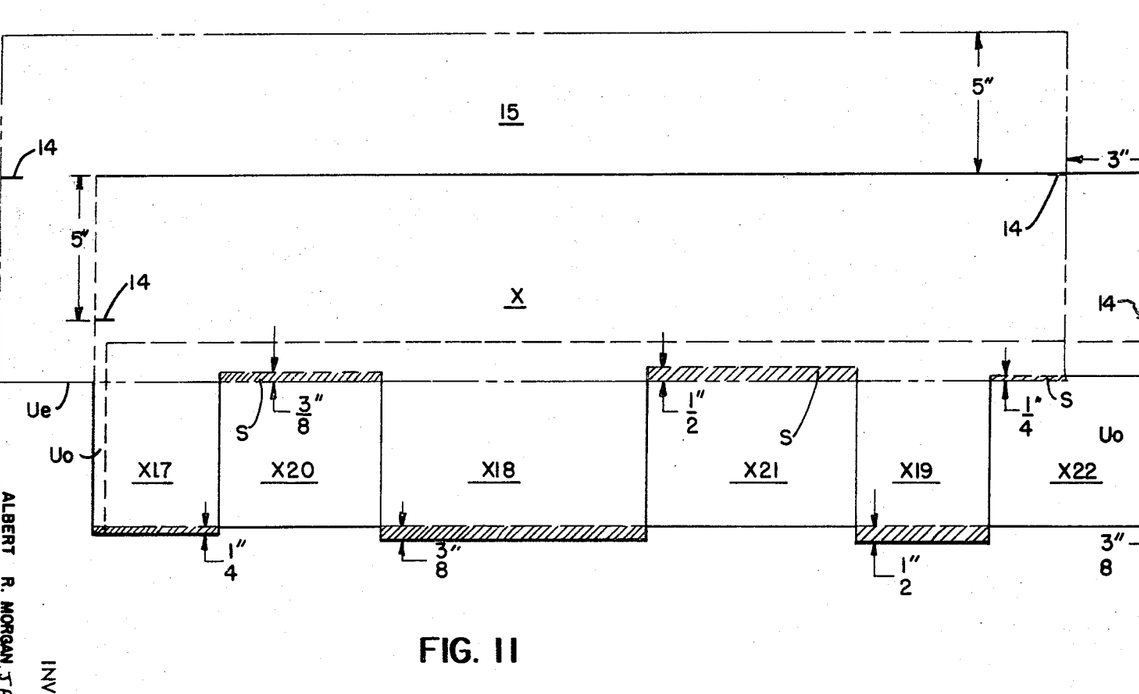
FIG. 11 is a plan view of a laminated shingle according to the invention with overlay X, showing superimposed in rectangular outline the position of an overlying shingle as laid in the next course above, demonstrating how the butt line of the overlying shingle overhangs the tops of the cut-outs in the overlay lamina of the underlying shingle.

FIG. 11 shows how the lower edge of the underlay lamina of the overlying shingle 15 (the next course above on the roof) overhangs the tops of the cut-out spaces X20, X21 and X22 (tab-simulating areas) in the overlay lamina X of the underlying shingle. Except for the differences in dimensions of the tabs and simulated tabs this drawing would also apply to a laminated shingle produced with overlay lamina Y.

The laminated shingles of the typical example of this invention, above described, provides a 2¼" headlap 28, require 80 shingles per square (100 sq. ft. of roof area covered) and weight about 330 lbs. per square. A ¾" wide strip of self-sealing adhesive asphalt 23 on the reverse side of the underlay lamina, centered 1½" from its lower edge, and a release tape 24, 1½" wide, centered 1½" from the upper edge on the reverse side of the overlay shingle lamina, as shown in FIG. 12, were provided to enable the shingles to be packaged, shipped and stored without sticking together in the bundle. These laminated strip shingles therefore qualify for Underwriters' Laboratories class "C" wind resistance label. These laminated shingles provide a minimum of double coverage of shingle material for all areas of the roof and at least triple coverage in the laminated tab areas.

SUMMARY OF SHADOW-PRODUCING EFFECTS OF NOVEL STRUCTURAL RELATIONSHIPS OF THE SHINGLE PARTS

Figure 10:
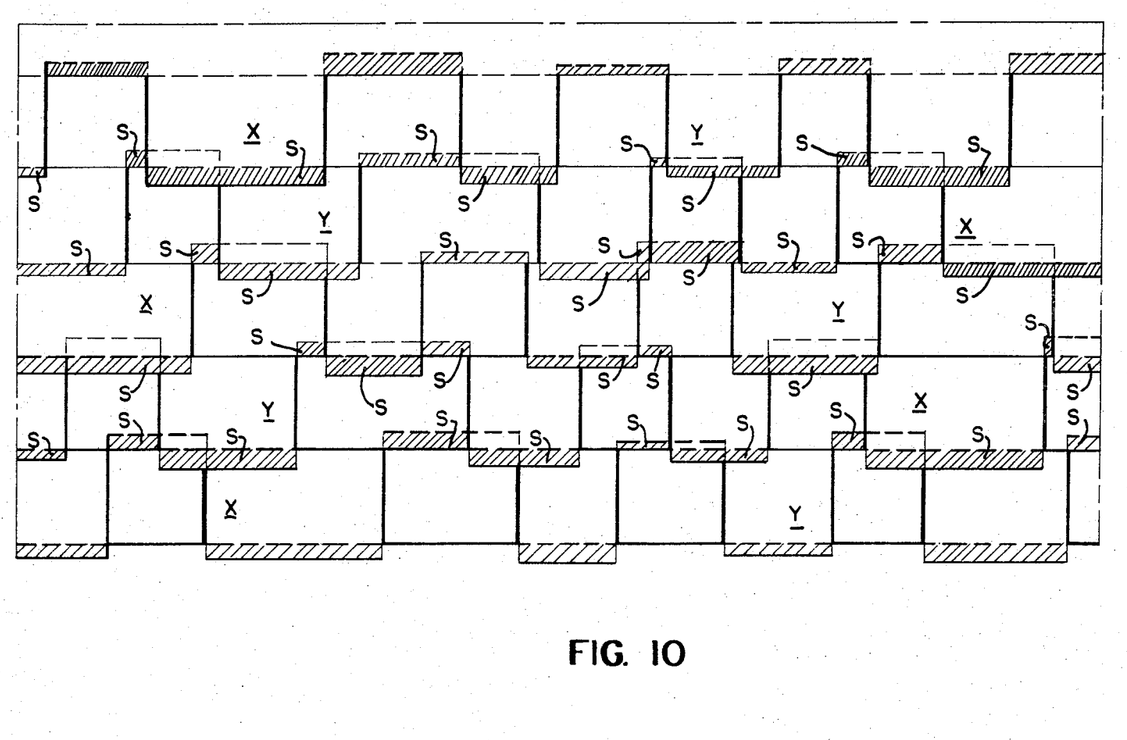
FIG. 10 is a diagrammatic plan view of a roof having several successive courses of the laminated shingles, laid with shingles having alternate X and Y overlays, showing by hatching and by exaggerated black lines the areas where natural shadows will be cast on adjacent areas, i.e. along the vertical edges of the overlay tabs, beneath the extended butt edges of the overlay tabs, and beneath the projected lower edge of the underlay lamina overhanging the cut-outs between the tabs.

FIG. 10 has particular significance because its summarizes in a single drawing the shadow-producing behavior of the novel laminated strip shingle, as shown separately in FIG. 4, FIG. 5, FIG. 6, FIG. 8, FIG. 9 and FIG. 11. FIG. 10 is a diagrammatic plan view of a roof area covered with successive courses of the laminated shingles of the typical example, laid alternately with X and Y overlays in each course. The shingles were laid in accordance with the programmed three-course offset schedule described above and illustrated in FIG. 4 and FIG. 5.

The locations where natural shadows S will be cast are indicated by hatching of the overhung tabs and the overhung shingle edges and by exaggerated black lines along the vertical edges of the tabs. It is of course evident that these shadows do not appear constantly in a fixed pattern as shown in the schematic drawing, but vary with many factors, including the time of day, intensity of sunlight, angle of the sun, slope of the roof and position of the viewer. The shadows produced are *variable* in the same way that is characteristic of natural shadows on a wood shingle roof.

The present materials, manufacturing methods and equipment of the asphalt roofing industry make it preferable to produce this novel strip shingle as a laminated structure of conventional asphalt shingle composition. It is clearly evident, however, that a strip shingle having the extended shadow-producing tabs and the other structural and visual relationships of the shingle parts as herein disclosed could be produced as a unitary molded product and from other materials. Any suitably weather-resistant composition, such as cement-asbestos, synthetic plastics, or resin-bonded wood fiber, that is capable of being molded into a relatively thin, elongated unitary strip, could be used. Numerous known molding methods are available, including direct pressure molding, filter molding, vacuum molding, and injection molding, that could be adapted to the manufacture of such a product. A strip shingle thus produced to have the structural relationships herein disclosed, so as to simulate the appearance characteristics of a wood shingle roof, would be within the scope of this invention.

Numerous modifications may be made without departing from the spirit of the invention and therefore no limitation not specifically set forth in the claims is intended or should be implied.

The embodiments of the invention in which an exclusive property or privilege is claimed are defined as follows:

1. A laminated composition strip shingle consisting of a mineral granule surfaced asphalt shingle of the full width of the strip as the overlay lamina, said overlay shingle having in its lower, exposure portion multiple, widely-spaced cut-out tabs of generally rectangular shape and of different widths and lengths, and underneath said lower portion of the strip a narrow, unitary underlay lamina of shingle material of the same kind as the overlay shingle and of the full length of the strip adhesively secured thereto, said underlay lamina filling the cut-out spaces between the tabs and constituting tab-simulating areas between said tabs when said laminated shingle is laid on a roof, said underlay lamina being so positioned that at least two of said tabs extend substantially beyond the lower edge of said underlay lamina to form projecting ledges capable of casting natural shadows, said composite laminated strip shingle being adapted for application in courses on the roof in the usual manner to provide a shingle roof covering that closely simulates the irregular and random appearance and produces the natural, variable shadows characteristic of a wood shingle roof.

2. A laminated composition strip shingle according to claim 1, wherein all of said extended tabs project beyond the lower edge of said underlay lamina by different amounts.

3. A laminated strip shingle according to claim 1, in which the overlay shingle lamina has at least three tabs and the lower edge of one end tab coincides with the lower edge of the underlay lamina and each of the other tabs projects beyond the lower edge of said underlay lamina by a different distance.

4. A laminated strip shingle according to claim 1, in which the overlay shingle lamina is about 12 inches wide and from 36 to 48 inches long and said overlay lamina has at least two, and not more than five tabs.

5. A laminated strip shingle according to claim 1, in which a side edge of one or more of said overlay shingle tabs deviates 2° to 8° from a line drawn vertical to the lower edges of said tabs.

6. A laminated strip shingle according to claim 1, in which the underlay lamina is offset laterally by at least ¼ inch, so that the overlay lamina provides a cover for the abutting end joints of adjacent shingles in the course when they are applied, to prevent leakage of water through the joint.

7. A laminated composition strip shingle according to claim 4, wherein one of said extended tabs and one of said tab-simulating areas are relatively wide and the remaining tabs and simulated-tabs are of narrower width.

8. A laminated composition strip shingle according to claim 2, in which the dimensions of the exposed area of each tab differ from the dimensions of the other tabs and the dimensions of the tab-simulating areas between said tabs also differ from each other and from each of the tab dimensions, to provide a random, irregular tab appearance when the shingles are applied in courses as a roof covering.

9. A laminated composition strip shingle according to claim 1, in which the width of the underlay lamina does not exceed 60 percent of the width of the overlay shingle lamina.

10. A laminated asphalt composition strip shingle consisting of a mineral granule surfaced asphalt shingle of the full width of the strip as the overlay lamina, said overlay shingle having in its lower, exposure portion multiple widely-spaced cut-out tabs of generally rectangular shape and of different widths and lengths, and underneath said lower portion of the strip an underlay lamina of shingle material of the same kind as the overlay shingle, of width not exceeding 60 percent of the width of the overlay shingle lamina and of the full length of the strip, adhesively secured thereto by a weather-resistant adhesive, said underlay lamina closing the cut-out spaces between the tabs and constituting tab-simulating areas between said tabs when said laminated shingle is laid on a roof, said underlay lamina being so positioned that all of said tabs extend beyond the lower edge of the underlay lamina, each forming a projecting ledge of different width in the range of ¼ inch to ¾ inch, said underlay lamina being shifted laterally by at least ⅜" from the end edge of the overlay shingle lamina so that the overlay lamina forms a cover for the end joints of adjacent shingles in a course, said laminated strip shingle having vertical alignment marks at each end below the top edge of the overlay shingle so positioned that when the shingles are laid the lower edge of the underlay lamina overhangs the cut-out spaces between the tops of the tabs of the shingles of the underlying course, said laminated strip shingle also having two horizontal laying marks at each end of the top edge to provide a three-course cycle for offset laying of successive courses of shingles whereby excessive grouping of similar tabs in local areas of the roof is avoided, said laminated strip shingles when thus laid providing an overall apperance of natural irregularity of length, width and thickness of the shingles, irregularity of the course line, and casting variable, natural shadows along the vertical edges of the tabs and along the upper edge of the underlying course to simulate closely the characteristic appearance features of a wood shingle roof.

11. A laminated asphalt composition strip shingle according to claim 10, in which the granules surfaced coating layer of the overlay shingle tabs is embossed with a texture pattern of spaced lines and the tab-simulating areas are embossed with a different texture pattern as to spacing of lines and depth or width of embossing to accentuate visually the difference in surface elevation of these areas.

12. A laminated asphalt composition strip shingle according to claim 10, in which the granule surfaced coating layer of the tab-simulating areas of the underlay lamina exposed between the tabs has had its surface texture altered by embossing with spaced lines and the tabs of the overlay shingle lamina are smooth.

13. A laminated asphalt composition strip shingle according to claim 10, in which the exposed tabs of the overlay shingle lamina are provided with a granule surfacing of a different size and grading than the tab-simulating areas of the underlay lamina exposed between said tabs.

14. A laminated asphalt composition strip shingle according to claim 10, in which the exposed tabs of the overlay shingle lamina are provided with a granule surfacing of a color different from that of the granule surfacing of the tab-simulating areas of the underlay lamina exposed between said tabs.

15. A laminated asphalt composition strip shingle consisting of an overlay lamina of mineral granule surfaced shingle material having in its lower, exposure portion multiple, widely-spaced cut-out tabs of generally rectangular shape and of different widths and lengths, and having beneath said lower portion of the strip a unitary underlay lamina of similar shingle material adhesively secured thereto, said underlay lamina closing the cut-out spaces between the tabs and constituting tab-simulating areas between said tabs when the laminated shingle is laid on a roof, said overlay lamina being so positioned vertically in relation to said underlay lamina as to provide multiple, extended shadow-producing tabs, said underlay lamina having along its lower, exposed edge irregularly-spaced, stepped cuts with peaks and valleys, said peaks being of a height not greater than the distance that the tabs extend beyond the lower edge of the course line of the shingle as applied on a roof, said peaks being aligned with and extended beneath said tabs to provide support therefor and said valleys being in the tab-simulating areas between said extended tabs to provide an irregular butt line for the composite laminated shingle.

16. A laminated composition strip shingle according to claim 15, in which said overlay shingle lamina is about 12¾ inches wide and from 36 inches to 48 inches long, said extended shadow-producing tabs form projecting ledges of ¼ to ½ inch beyond the lower course line of the laminated shingle as applied, said underlay lamina is about 6¾ inches wide and of the same length as the overlay lamina, and said underlay lamina has the peaks and valleys of the stepped cuts at ¼ inch height at the ends of the strip, peaks of ⅜ inch height aligned with the remaining extended tabs, and valleys of ⅜ inch depth aligned with the tab-simulating areas between the tabs.

17. A laminated asphalt composition strip shingle according to claim 10, in which the overall dimensions of the overlay shingle lamina are 12¾" x 36", the underlay lamina is 6½" x 36", the tab widths are, respectively, 4¼", 8¾" and 4½" and the widths of the tab-simulating spaces are, respectively, 5½", 7¼" and 5¾", the vertical alignment marks are 5" below the top edge of the overlay lamina, the underlay lamina is offset laterally ⅜" from the left end of the strip, the left end overlay tab extends ¼ inch below the lower edge of the underlay lamina, the middle tab extends ⅜ inch and the right end tab extends ½ inch below said lower edge, and the horizontal laying marks are positioned 3 inches and 6 inches, respectively from each end of the top line of the overlay shingle lamina.

18. A laminated asphalt composition strip shingle according to claim 10, in which the overall dimensions of the overlay shingle lamina are 12¾" x 36", the underlay lamina is 6½" x 36", the tab widths are, respectively, 5¾", 7¼" and 5½" and the widths of the tab-simulating spaces are, respectively, 4½", 8¾" and 4¼", the vertical alignment marks are 5" below the top edge of the overlay lamina, the underlay lamina is offset laterally ⅜" from the left end of the strip, the left end tab extends ¼ inch below the lower edge of the underlay lamina, the middle tabs extends ½ inch and the right end tab extends ⅜ inch below said lower edge, and said horizontal laying marks are positioned 3" and 6", respectively, from each end of the top line of the overlay shingle lamina.

19. A laminated asphalt composition strip shingle according to claim 10, in which the reverse side of the underlay lamina has a discontinuous strip of thermosensitive adhesive asphalt, centered 1½" from the lower edge of said lamina and the reverse side of the overlay shingle lamina has a release tape of greater width than said adhesive asphalt strip, centered 1½" from the upper edge of said overlay lamina, said adhesive asphalt when activated by solar heat, after the shingles have been laid on a roof, sealing the shingle to the shingles of the underlying course to render the roof covering wind-resistant.

References Cited

UNITED STATES PATENTS

| | | | |
|---|---|---|---|
| 1,705,497 | 3/1929 | Overbury | 52—557 |
| 1,958,560 | 5/1934 | Beckman | 52—557 |
| 2,171,010 | 8/1939 | Schuetz et al. | 52—555 |
| 2,199,760 | 5/1940 | Schuetz | 52—555 |
| 3,377,762 | 4/1968 | Chalmers et al. | 52—555 |
| 3,407,556 | 10/1968 | Leibrook | 52—559 |

PATRICK D. LAWSON, Primary Examiner